United States Patent [19]

Erbrick et al.

[11] Patent Number: 4,899,445

[45] Date of Patent: Feb. 13, 1990

[54] HAND-HELD RATCHET TOOL FOR MOVING A PAIR OF JAW MEMBERS TOWARD AND AWAY FROM EACH OTHER

[75] Inventors: Robert S. Erbrick, Danboro; Manfred E. Strohecker, Doylestown; Joseph E. Erbrick, Jr., Chalfont, all of Pa.

[73] Assignee: Electroline Corp., Danboro, Pa.

[21] Appl. No.: 356,030

[22] Filed: May 23, 1989

[51] Int. Cl.$^4$ .............................................. B26B 13/00
[52] U.S. Cl. ....................................................... 30/251
[58] Field of Search ................................. 30/191–193, 30/250, 251; 81/314, 33 D, 34 D

[56] References Cited

U.S. PATENT DOCUMENTS

| | | | |
|---|---|---|---|
| 2,308,684 | 1/1943 | Geddes | 30/193 |
| 4,176,450 | 12/1979 | Muromoto | 30/251 X |
| 4,178,682 | 12/1979 | Sadauskas | 30/250 |

OTHER PUBLICATIONS

Greenlee Tool Division of Ex–Cell–O Corporation, Bulletin No. E–708, published Oct. 1, 1979.

*Primary Examiner*—Douglas D. Watts
*Attorney, Agent, or Firm*—Panitch Schwarze Jacobs and Nadel

[57] ABSTRACT

A hand-held ratchet tool for moving a pair of jaw members toward and away from each other. The tool comprises a first and second elongated handle, each having a first end and a second end. The second end of the first handle is pivotally connected to the second end of the second handle. The tool further comprises a first jaw member pivotally mounted on the second end of the first handle and an elongate linkage having a first end pivotally mounted on the second end of the second handle and having a second end. The second end of the linkage, the first jaw member and a second jaw member are all pivotally connected along a common pivot axis. The second jaw member includes a plurality of ratchet teeth for receiving a pawl. A pawl is pivotally mounted on the second end of the second handle along the same axis as the pivotal connection between the elongate linkage and the second handle. The pawl has a first set of ratchet teeth and a second set of ratchet teeth alternatively biased into engagement with the ratchet teeth of the second jaw member for alternatively driving the second jaw member toward and away from the first jaw member. A thumb member operatively associated with the pawl for selectively biasing either the first set of pawl ratchet teeth or said second set of pawl ratchet teeth into engagement with the ratchet teeth of the second jaw member is provided for selecting the direction in which the jaw members move with respect to each other when said handles are pivoted relevant to each other. The tool further comprises a mechanism mounted on the first handle for limiting the relative movement of the first handle with respect to the second handle and, thus, the relative movement of the first jaw member with respect to the second jaw member. This mechanism restricts the stroke of the handle members to the area wherein the greatest cutting force is achieved.

19 Claims, 3 Drawing Sheets

FIG. I

HAND-HELD RATCHET TOOL FOR MOVING A PAIR OF JAW MEMBERS TOWARD AND AWAY FROM EACH OTHER

FIELD OF THE INVENTION

The present invention relates to a hand-held ratchet tool and, more particularly, to a hand-held ratchet tool for cutting cable by moving a pair of jaw members toward and away from each other.

BACKGROUND OF THE INVENTION

In the cable cutting field, there exists a need for a cable cutter which includes a ratchet mechanism for controlling the movement of the jaw members toward and away from each other. There further exists a need for a hand-held ratchet tool wherein the relative movement between the jaw members is inhibited to thereby control the time within which it takes to cut a cable and to limit the handle stroke to the area where the most cutting force is generated.

Conventionally, some cable cutters move their jaw members with respect to each other by a direct linkage mechanism employed between the jaw members and the handles. Other cable cutters employ complex linkage to increase the cutting force, but such designs do not approach the results achieved by ratchet cable cutters. Less complicated cable cutters employ a pair of elongated handles each having a jaw member directly attached to one end. The handles or jaw members are then pivotally connected much like standard pliers. In this case, the cutting force attributable to the cable cutter is directly related to the length of the handle.

Hand-held ratchet tools for cable cutting are known. Such tools have drawbacks which are solved by the present invention. For instance, conventional cable cutting hand-held ratchet tools can only move their jaw members toward each other or towards a closed position. The jaws are moved away from each other by hand or are spring released. The spring-released ratchet tools are problematic in that they are difficult or expensive to manufacture, as well as being a safety hazard since the jaw members are not always totally controlled by the user.

Furthermore, conventional hand-held ratchet tools do not include any mechanism for selectively limiting the relative movement of the handles and, consequently, the jaw members. That is, the handles of these tools have a range of motion from a first position where the handles are closest together with respect to each other to a second position where the handles are the furthest apart from each other. As the handles are moved from the second position to the first position, the cutting force generated at the jaw members varies. More particularly, when the handles are near the second position, the cutting force is less than when the handles are near the first position. Therefore, a need arose wherein the handle stroke could be selectively limited to the area where the most cutting force is generated at the jaw members (i.e., near the first position). On the other hand, it is still needed to have a mode wherein the handle stroke is not limited to allow the jaw members to quickly move from the open to the closed position and vice versa, to thereby save time.

The present invention overcomes many of the disadvantages inherent in the above-described hand-held tools by providing a hand-held ratchet tool for moving a pair of jaw members toward and away from each other. Thus, the relative position of the jaw members is always in complete control of the user. Moreover, the present invention provides means for selectively limiting the relative movement of the handles to an area where the most cutting force is generated and, at the same time, provide a mode wherein the jaw members can quickly move from the closed to the open position and vice versa.

SUMMARY OF THE INVENTION

Briefly stated, the present invention, in one embodiment, comprises a hand-held ratchet tool for moving a pair of jaw members toward and way from each other. The hand-held ratchet tool comprises a first and second elongated handle, each having a first end and a second end. The second end of the first handle is pivotally connected to the second end of the second handle. The second end of the first handle includes a first jaw member pivotally mounted thereon. An elongate linkage has a first end which is pivotally mounted on the second end of the second handle and further includes a second end. The second end of the linkage, the first jaw member and a second jaw member are all pivotally connected along a common pivot axis. The second jaw member includes a plurality of ratchet teeth for receiving a pawl. A drive means mounted on the second end of the second handle is drivingly connected to the ratchet teeth for driving the second jaw member with respect to the first jaw member when the first and second handles are moved with respect to each other. More particularly, the drive means is a pawl pivotally mounted along the same axis as the pivotal connection between the elongate linkage and the second handle. The pawl has a first set of ratchet teeth and a second set of ratchet teeth alternatively biased into engagement with the ratchet teeth of the second jaw member for alternatively driving the second jaw member towards and away from the first jaw member. Selective biasing means is operatively associated with the pawl member for selectively biasing either the first set of pawl ratchet teeth or the second set of pawl ratchet teeth into engagement with the ratchet teeth of the second jaw member, whereby when the first set of ratchet teeth are biased into engagement with the ratchet teeth of the second jaw member, relative movement between the first and second handles moves the first jaw member with respect to the second jaw member in one direction, and when the second set of ratchet teeth are biased into engagement with the second jaw member ratchet teeth relative movement between the first and second handles moves the first jaw member with respect to the second jaw member in a second direction. The ratchet tool further includes inhibiting means mounted on the first handle for limiting the relative movement of the first handle with respect to the second handle, whereby the relative movement of the first jaw member with respect to the second jaw member is likewise inhibited.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF THE PREFERRED EMBODIMENT

Figure 1:
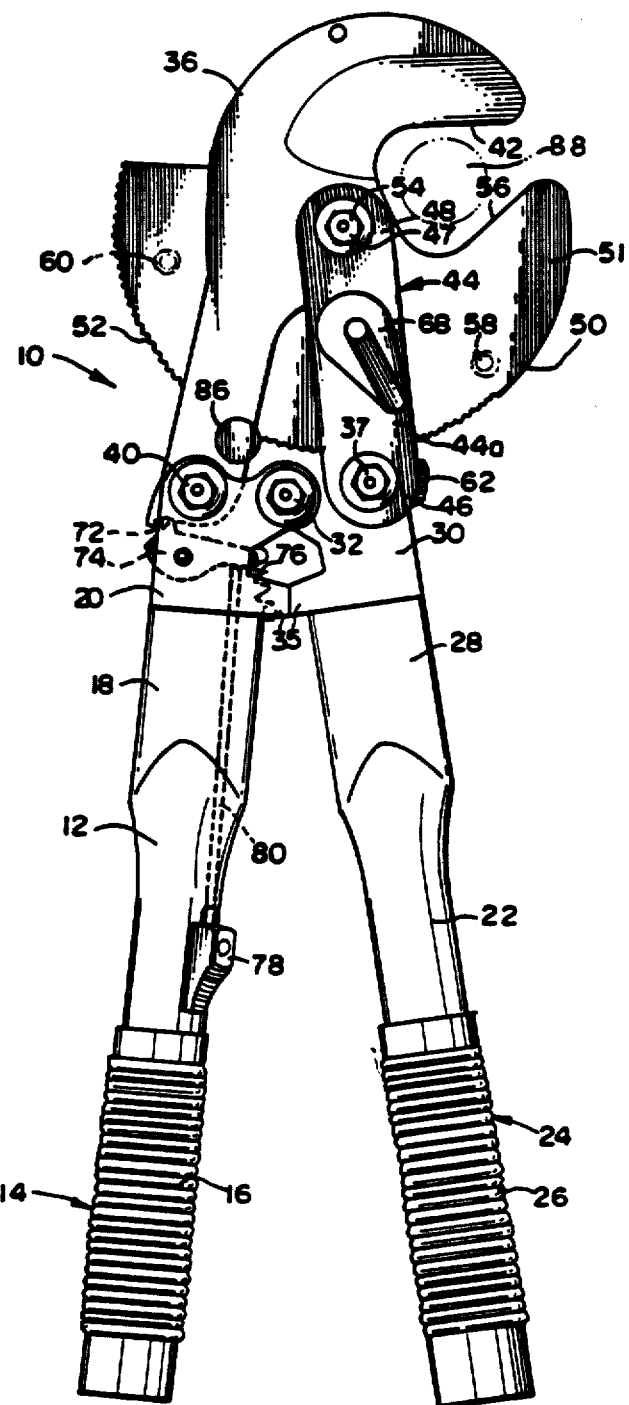
FIG. 1 is a front elevational view of a hand-held ratchet tool in accordance with the present invention.

Certain terminology is used in the following description for convenience only and is not limiting. The words "right," "left," "lower," and "upper" designate directions in the drawings to which reference is made. The words "inwardly" and "outwardly" refer to directions toward and away from, respectively the geometric center of the hand-held ratchet tool and designated parts thereof. The terminology includes the words above specifically mentioned, derivatives thereof, and words of similar import.

Referring to the drawings in detail, wherein like numerals indicate like elements throughout, there is shown in FIGS. 1 through 4 a preferred embodiment of a hand-held ratchet tool in accordance with the present invention. FIG. 1 illustrates a hand-held ratchet tool for moving a pair of jaw members toward and away from each other and is generally designated 10. In the present embodiment, it is preferred that the hand-held ratchet tool 10 be used in conjunction with cutting cable. However, it is understood by those skilled in the art that the present invention is applicable to other uses wherein a pair of jaw members are moved toward and away from each other. For example, the hand-held ratchet tool 10 could readily be adapted to function in a manner similar to pliers or vise grips (not shown).

As shown in FIG. 1, the hand-held ratchet tool 10 comprises a first generally elongated handle 12 having a first end 14, preferably including a handle grip 16 mounted thereon for a user to grip, and a second end 18. Preferably, first elongated handle 12 is generally constructed of a lightweight, high strength material, such as steel. However, it is understood by those skilled in the art that the handle 12 could be constructed of other materials exhibiting such strength characteristics, such as fiberglass having a high modules of elasticity. Further, in the present embodiment, it is preferred that the handle grip 12 be constructed of a polymer. However, it is apparent to the ordinarily skilled artisan that the handle grip can be constructed of other suitable materials, such as rubber.

For convenience and ease of description only, the remaining components of hand-held ratchet tool 10, described hereinafter, are preferably constructed of a high strength, lightweight material, such as steel, except as noted. However, it is understood by those skilled in the art that the various components can be constructed of other material. For example, the non-load bearing components could be constructed of a polymer.

Figures 3, 4:
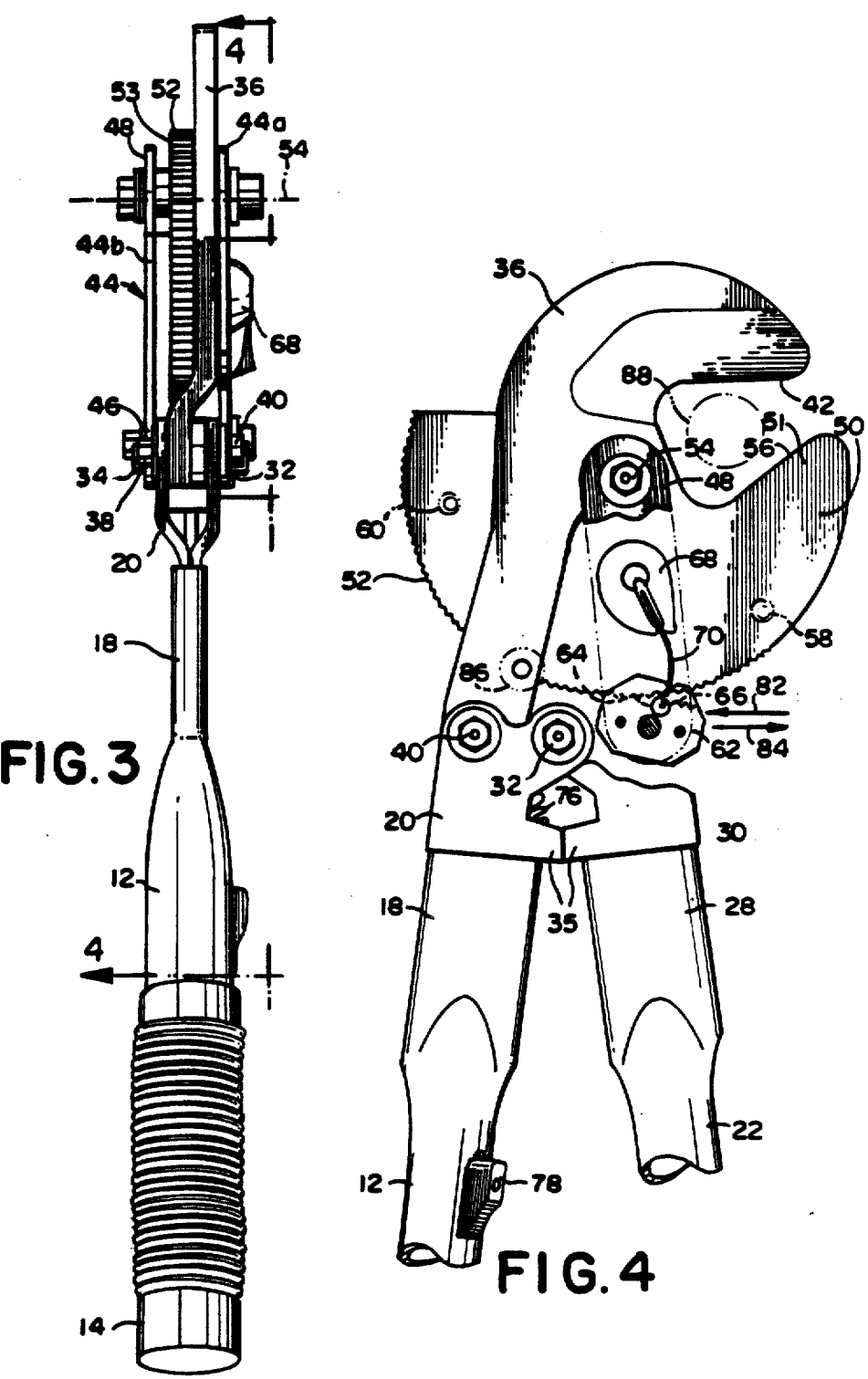
FIG. 3 is a side elevational view of the hand-held ratchet tool shown in FIG. 1.
FIG. 4 is an enlarged elevational view in partial cross section of the hand-held ratchet tool of FIG. 3 taken along line 4—4 of FIG. 3.

As shown in FIG. 3, preferably first handle end 14 is generally cylindrically shaped, whereas the second end 18 is generally planar or flatly shaped and includes a generally U-shaped or clevis-like member 20 depending therefrom.

Figure 2:
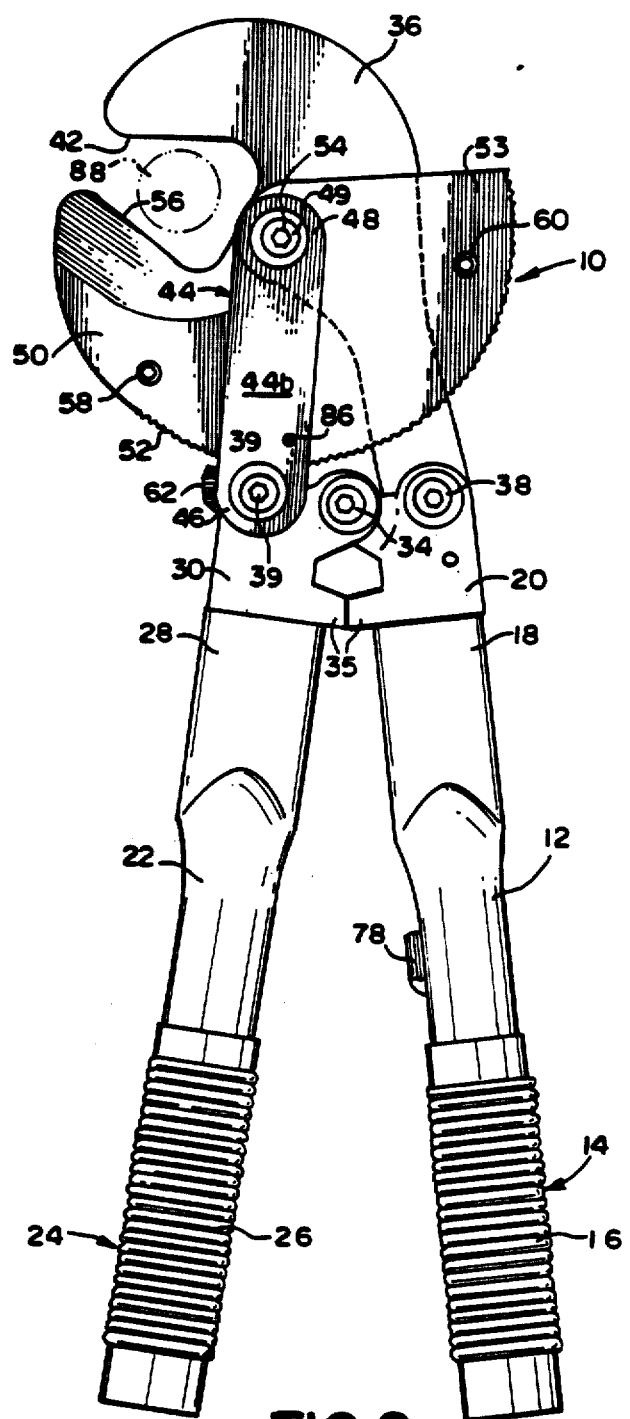
FIG. 2 is a rear elevational view of the hand-held ratchet tool shown in FIG. 1.

A second elongated handle 22 is shown in FIGS. 1 and 2. Second elongated handle 22, as in first elongated handle 12, includes a first end 24, preferably including a handle grip 26 for a user to grip. Second elongated handle 22 further includes a second end 28 having a generally U-shaped or clevis-like member 30 depending therefrom. Preferably, the size, construction, material and shape of second elongated handle 22 is generally identical to the first elongated handle 12, as described above.

As shown in FIGS. 1 and 2, the second end 18 of the first elongated handle 12 is pivotally connected to the second end 28 of the second elongated handle 22. In the preferred embodiment U-shaped members 20 and 30 of the first and second elongated handles 12 and 22, respectively, are pivotally connected along a common pivot axis by a bolt 34 which passes through suitably sized and aligned openings in U-shaped members 20 and 30. A nut 32 threadingly engages threads on the shank of the bolt 34 to hold the bolt 34 in place. However, it is understood by those skilled n the art that the pivotal connection between first and second handles 12 and 22 could be accomplished by other known means. For example, U-shaped members 20 and 30 could be interconnected by a rivet or hinge-like pin.

As shown in FIG. 1, a first jaw member 36 is pivotally mounted on the second end 18 of first handle 12 proximate the pivotal connection between the first and second handles 12 and 22. Preferably, first jaw member 36 is pivotally connected to first handle 12 in a manner similar to the pivotal connection between the first and second handles 12 and 22. That is, as shown in FIG. 3, first jaw member 36 is pivotally mounted between the legs of U-shaped member 20 by a bolt 40 which extends through suitably aligned openings and is held in place by a nut 38. Preferably, first jaw member 36 is generally L-shaped and includes a beveled cutting edge 42 sharp enough to shear cable.

While in the preferred embodiment, most of the pivotal connections are accomplished by the use of a bolt, it is apparent to those skilled in the art that other means can be used to effect the pivotal connections, such as rivets or hinge-like pins.

As shown in FIGS. 1 and 2, an elongate linkage general designated 44, has a first end 46 pivotally mounted on second end 28 of the second handle 22 proximate the pivotal connection between the first and second handles 12 and 22. Elongate linkage 44 further includes a second end 48. In the preferred embodiment, elongate linkage 44 is pivotally connected to U-shaped member 30, by a bolt 39 which extends through suitably sized and aligned openings and is held in place by a nut 37. As shown in FIG. 3, it is preferred that elongate linkage 44 be comprised of a first member 44a and a second member 44b, each being connected to different legs of U-shaped member 30. The use of second linkage member 44b adds to the structural integrity of hand-held ratchet tool 10 while at the same time helps define the closed position of the jaw members, as described hereinafter.

As shown in FIGS. 1 and 2, second end 48 of elongate linkage 44, first jaw member 36 and a second jaw member 50 are all pivotally connected along a common axis 54 by a bolt 49 which extends through suitably sized and aligned openings and is held in place by a nut 42. Second jaw member 50 includes a plurality of ratchet teeth 52 for receiving a pawl, as described hereinafter. Preferably, second jaw member 50 is generally semi-circular shaped with the plurality of ratchet teeth 52 positioned about the circumference thereof. Second jaw member 50 preferably includes a beveled cutting edge 56, sharp enough to shear cable and operatively associated with the cutting edge 42 of first jaw member 36 for cutting cable.

Second jaw member 50 further includes stop means for limiting the relative movement of first jaw member 36 with respect to second jaw member 50. The stop means for limiting the relative movement of first and second jaw members 36 and 50, in the present embodiment comprises pegs 58 and 60 which preferably encounter the second member 44b of elongate linkage 44 as second jaw member 50 moves with respect thereto. The pegs 58 and 60 encounter second member 44b at the point where the jaw members are fully closed and fully opened, respectively. Preferably, pegs 58 and 60 are generally circular in cross section and are frictionally mounted within generally circular holes in second jaw member 50. Furthermore, pegs 58 and 60 are flushly mounted (shown in phantom) on the surface 51 of second jaw member 50 so as to allow first jaw member 36 and second jaw member 50 to assume a facing relationship. However, pegs 58 and 60 depend outwardly from the surface 53 of second jaw member 50 away from first jaw member 36 so as to encounter elongate linkage 44 when said first and second jaw members assume their fully open and closed positions.

In the present embodiment, the handles 12 and 22 have a respective range of motion from a first position (as shown in FIG. 1) where the handles 12 and 22 are closest together with respect to each other to a second position (not shown) where the first ends of the handles 12 and 22 are furthest apart from each other. Each U-shaped member 20 and 30 includes a stop member 35 projecting towards the other respective U-shaped member. The handles are in the first position when the stop members 35 are engaged. The handles are in the second position when the first member 44a of elongate linkage 44 contacts the stop disc 86 positioned on jaw member 36.

Referring now to FIG. 4, a drive means is mounted on the second end 28 of second handle 22 and is drivingly connected to the ratchet teeth 52 for driving second jaw member 50 with respect to first jaw member 36 when the first and second handles 12 and 22 are moved with respect to each other. In the presently preferred embodiment, the drive means is a pawl 62 pivotally mounted between the legs of U-shaped member 30 of second handle 22 preferably along the same axis as the pivotal connection between elongate linkage 44 and second handle 22. Pawl 62 has a first set of ratchet teeth 64 and a second set of ratchet teeth 66 alternatively biased into engagement with ratchet teeth 52 of second jaw member 50 for alternatively driving second jaw member 50 towards and away from first jaw member 36, as described in more detail hereinafter.

As shown in FIGS. 1 and 4, hand-held ratchet tool 10 further includes selective biasing means operatively associated with pawl 62 and mounted on the first linkage member 44a of elongate linkage 44 for selectively biasing either the first set of pawl ratchet teeth 64 or the second set of pawl ratchet teeth 66 into engagement with ratchet teeth 52 of second jaw member 50. In the presently preferred embodiment, the biasing means is a thumb member 68 pivotally mounted on first linkage member 44a for selectively engaging either the first set of ratchet teeth 64 or the second set of ratchet teeth 66 of pawl 62 into driving engagement with second jaw member ratchet teeth 52. Preferably, interconnected between thumb member 68 and pawl 62 is a leaf spring 70 for biasing pawl 62 into the desired position. Thumb member 68 has a first position (as shown in FIGS. 1 and 4) such that first set of ratchet teeth 64 are biased into engagement with second jaw member ratchet teeth 52 and a second position (not shown) such that second set of ratchet teeth 66 are biased into engagement with second jaw member ratchet teeth 52. The operation of the selective biasing means in conjunction with pawl 62 is described in more detail hereinafter.

Referring now to FIG. 1, inhibiting means is mounted on first handle 12 for limiting the relative movement of first handle 12 with respect to second handle 22, whereby the relative movement of first jaw member 36 with respect to second jaw member 52 is likewise inhibited. The inhibiting means has a first position (shown in FIG. 1) and a second position (not shown) such that the relative movement is less in the first position than in the second position.

In the presently preferred embodiment, the inhibiting means comprises a shoulder 72 positioned on first jaw member 36 and a finger 74 pivotally mounted on first handle 12, preferably on U-shaped member 20, proximate shoulder 72. Finger 74 is biased into engagement with first jaw member 36 in the first position (as shown in FIG. 1) such that finger 74 engages shoulder 72 to limit the relative movement between first jaw member 36 and first handle 12, which, in turn, limits the relevant movement between the first and second handles and jaw members. Finger 74 is preferably biased into engagement with first jaw member 36 by a spring 76 interconnected between finger 74 and stop member 35 on second end 18 of first handle 12, as shown in FIG. 1.

The inhibiting means further includes actuator means reciprocally mounted on first handle 12 for allowing the user to select the first or second position. In the preferred embodiment, the actuator means is preferably a knob 78 reciprocally mounted on the first handle 12. Knob 78 is preferably constructed of a polymer, but it is apparent to those skilled in the art that knob 78 can be constructed of other suitable materials, such as steel. Knob 78 is operatively engaged with finger 74 by an elongated bar 80 for pivoting finger 74 into the second position (not shown) whereby finger 74 cannot engage shoulder 72 and inhibit the relative movement between the handles 12 and 22 and jaw members 36 and 50.

Referring now to FIG. 4, in operation, pawl 62 is moved in a first direction, as shown by the arrow 82, upon pivoting handles 12 and 22 away from each other and pawl 62 is moved in a second direction, as shown by the arrow 84, upon pivoting handles 12 and 22 towards each other.

When the first set of ratchet teeth 64 are biased into engagement with ratchet teeth 52 of second jaw member 50 by placing thumb member 68 in the first position (as shown in FIG. 4), relative movement between first and second handles 12 and 22 moves first jaw member 36 with respect to second jaw member 50 in one direction or away from each other towards the open position. This is so, because first set of ratchet teeth 64 are in an overrunning relationship with second jaw member ratchet teeth 52 when pawl 62 is moved in the second direction 84, and first set of ratchet teeth 64 are in an intermeshing relationship with the second jaw member ratchet teeth 52 to directly drive the second jaw member 50 when pawl 62 is moved in the first direction 82.

When second set of ratchet teeth 66 are biased into engagement with second jaw member ratchet teeth 52 by placing thumb member 68 in the second position (not shown), relative movement between first and second handles 12 and 22 moves first jaw member 36 with respect to second jaw member 50 in a second direction or towards each other to the closed position. This results because when second set of ratchet teeth 66 are biased into engagement with second jaw member ratchet teeth 52, second set of ratchet teeth 66 are in an overrunning relationship with second jaw member ratchet teeth 52 when pawl 62 is moved in the first direction 82 and the second set of ratchet teeth 66 are in an intermeshing relationship with the second jaw member ratchet teeth 52 to directly drive the second jaw member 50 when pawl 62 is moved in the second direction 84.

With respect to the operation of the inhibiting means, as the handles 12 and 22 move from the second position where they are furthest apart to the first position where they are closest together with respect to each other, the cutting force applied by the jaw members 36 and 50 is increased due to the linkage of the ratchet-tool 10 and shape of second jaw member 50, as is understood by those skilled in the art. By placing the inhibiting means in the first position, the handles can only move from the first position where they are closest together to an intermediary position, where the handles 12 and 22 are not furthest apart. This effectively, limits the range of movement of the handles to an area where the most cutting force is generated. When the inhibiting means is placed in the second position, the handles have a full range of motion, thereby allowing the jaw members 36 and 50 to quickly move from the open to the closed position and vice versa, thereby saving time.

In the preferred embodiment, when the handles 12 and 22 are moved from their first position to the intermediary position three (3) ratchet teeth 52 on second jaw member 50 are overrun when second set of ratchet teeth 66 are biased into engagement with ratchet teeth 52. Similarly, when the handles 12 and 22 are moved from their first position to the second position eight (8) ratchet teeth 52 on second jaw member 50 are overrun. When first set of ratchet teeth 64 are biased into engagement with ratchet teeth 52 a similar result is obtained. It will be apparent to those skilled in the art that the range of motion of the handles can be varied as desired. For example, pawl 62 could overrun ten or five teeth to obtain a two to one ratio.

In use, first jaw member 36 and second jaw member 50 are positioned in the fully opened position so that they surround a cable 88, as shown Figs. 1, 2 and 4 in phantom. The knob 78 is moved to the second position and the thumb member 68 is placed in the first position. The handles 12 and 22 are then moved towards and away from each other to quickly close the jaws 36 and 50 about the cable 88. When the jaws engage the cable 88, knob 78 is moved to the first position and the handles 12 and 22 are moved towards and away from each other to close the jaws with power until the cable is completely cut. Then, thumb member 68 is placed in the second position (not shown) and the knob 78 is moved to the first position. The handles 12 and 22 are then moved towards and away from each other so that the jaw members 36 and 50 are quickly opened to prepare the hand-held ratchet tool for the next cutting operation.

From the foregoing description, it can be seen that the present invention comprises a hand-held ratchet tool for moving a pair of jaw members towards and away from each other. It will be appreciated by those skilled in the art that changes could be made the embodiment described above without departing from the broad inventive concept thereof. It is understood, therefore, that this invention is not limited to the particular embodiment disclosed, but it is intended to cover all modifications which are within the scope and spirit of the invention as defined by the appended claims.

We claim:

1. A hand-held ratchet tool for moving a pair of jaw members toward and away from each other, said hand-held ratchet tool comprising:
    a first elongated handle having a first end and a second end;
    a second elongated handle having a first end and a second end, said second end of said first handle being pivotally connected to said second end of said second handle;
    a first jaw member pivotally mounted on said second end of said first handle;
    an elongate linkage having a first end pivotally mounted on said second end of said second handle and having a second end;
    a second jaw member including a plurality of ratchet teeth, said second end of said linkage, said first jaw member and said second jaw member all being pivotally connected along a common pivot axis;
    drive means mounted on said second end of said second handle and drivingly connected to said ratchet teeth for driving said second jaw member with respect to said first jaw member when said first and second handles are moved with respect to each other.

2. The hand-held ratchet tool as recited in claim 1 further including inhibiting means mounted on said first handle for limiting the relative movement of said first handle with respect to said second handle, whereby the relative movement of said first jaw member with respect to said second jaw member is likewise inhibited, said inhibiting means having a first position and a second position such that said relative movement is less in said first position then in said second position.

3. The hand-held ratchet tool as recited in claim 2 wherein said inhibiting means is biased into said first position.

4. The hand-held ratchet tool as recited in claim 2 wherein said inhibiting means further includes actuator means reciprocally mounted on one of said handles for allowing the user to select said first or second position.

5. The hand-held ratchet tool as recited in claim 2 wherein said inhibiting means includes a shoulder positioned on said first jaw member and a finger pivotally mounted on said first handle proximate said shoulder, said finger being biased into engagement with said first jaw member in said first position such that said finger engages said shoulder to limit said relative movement.

6. The hand-held ratchet tool as recited in claim 5 wherein said inhibiting means further includes a knob reciprocally mounted on said first handle, said knob being operatively engaged with said finger for pivoting said finger into said second position whereby said finger relative cannot engage said shoulder and inhibit the relative movement between said jaw members.

7. A hand-held ratchet tool for moving a pair of jaw members toward and away from each other, said hand-held ratchet tool comprising:
   a first elongated handle having a first end and a second end;
   a second elongated handle having a first end and a second end, said second end of said first handle being pivotally connected to said second end of said second handle;
   a first jaw member pivotally mounted on said second end of said first handle;
   an elongate linkage having a first end pivotally mounted on said second end of said second handle and a second end;
   a second jaw member including a plurality of ratchet teeth for receiving a pawl, said second end of said linkage, said first jaw member and said second jaw member all being pivotally connected along a common pivot axis;
   a pawl pivotally mounted on said second end of said second handle along the same axis as the pivotal connection between said elongate linkage and said second handle, said pawl having a first set of ratchet teeth and a second set of ratchet teeth alternatively biased into engagement with the ratchet teeth of said second jaw member for alternatively driving said second jaw member towards and away from said first jaw member; and
   selective biasing means operatively associated with said pawl for selectively biasing either said first set of pawl ratchet teeth or said second set of pawl ratchet teeth into engagement with said ratchet teeth of said second jaw member, whereby when said first set of ratchet teeth are biased into engagement with said ratchet teeth of said second jaw member, relative movement between said first and second handles moves said first jaw member with respect to said second jaw member in one direction and when said second set of ratchet teeth are biased into engagement with said second jaw member ratchet teeth relative movement between said first and second handles moves said first jaw member with respect to said second jaw member in a second direction.

8. The hand-held ratchet tool as recited in claim 7 further including inhibiting means mounted on said first handle for limiting the relative movement of said first handle with respect to said second handle, whereby the relative movement of said first jaw member with respect to said second jaw member is likewise inhibited, said inhibiting means having a first position and a second position such that said relative movement is less in said first position than in said second position.

9. The hand-held ratchet tool as recited in claim 8 wherein said inhibiting means is biased into said first position.

10. The hand-held ratchet tool as recited in claim 8 wherein said inhibiting means further includes actuator means reciprocally mounted on one of said handles for allowing the user to select said first or second position.

11. The hand-held ratchet tool as recited in claim 8 wherein said inhibiting means includes a shoulder positioned on said first jaw member and a finger pivotally mounted on said first handle proximate said shoulder, said finger being biased into engagement with said first jaw member in said first position such that said finger engages said shoulder to limit said relative movement.

12. The hand-held ratchet tool as recited in claim 11 wherein said inhibiting means further includes a knob reciprocally mounted on said first handle, said knob being operatively engaged with said finger for pivoting said finger into said second position whereby said finger cannot engage such shoulder and inhibit the relative movement between said jaw members.

13. The hand-held ratchet tool as recited in claim 7 wherein said first jaw member is generally L-shaped and includes a cutting edge and said second jaw member is generally semi-circular shaped, having said plurality of ratchet teeth positioned about the circumference thereof and including a cutting edge operatively associated with the cutting edge of said first jaw member.

14. The hand-held ratchet tool as recited in claim 13 wherein said second jaw member further includes stop means for limiting the relative movement of said first jaw member with respect to said second jaw member.

15. The hand-held ratchet tool as recited in claim 7 wherein said selective biasing means includes a thumb member pivotally mounted on said linkage for selectively engaging either said first set of ratchet teeth or said second set of ratchet teeth of said pawl into driving engagement with said second jaw member ratchet teeth, said thumb member having a first position such that said first set of ratchet teeth are biased into engagement with said second jaw member ratchet teeth and a second position such that said second set of ratchet teeth are biased into engagement with said second jaw member ratchet teeth.

16. The hand-held ratchet tool as recited in claim 15 wherein said selective biasing means further includes a leaf spring interconnected between said thumb member and said pawl.

17. A hand-held ratchet tool for moving a pair of jaw members toward and away from each other, said hand-held ratchet tool comprising:
   a first elongated handle having a first end including a handle grip for a user to grip and a second end;
   a second elongated handle having a first end including a handle grip for a user to grip and a second end, said second end of said first handle being pivotally connected to said second end of said second handle;
   a first jaw member pivotally mounted on said second end of said first handle proximate the pivotal connection between said first and second handles;
   an elongate linkage having a first end pivotally mounted on said second end of said second handle proximate the pivotal connection between said first and second handles and a second end;
   a second jaw member including a plurality of ratchet teeth for receiving a pawl, said second end of said elongate linkage, said first jaw member and said second jaw member all being pivotally connected along a common pivot axis;
   a pawl pivotally mounted on said second end of said second handle along the same axis as the pivotal connection between said elongate linkage and said second handle, said pawl having a first set of ratchet teeth and a second set of ratchet teeth alternatively biased into engagement with the ratchet teeth of said second jaw member for alternatively driving said second jaw member towards and away from said first jaw member, when said first set of ratchet teeth are biased into engagement with said second jaw member ratchet teeth, said first set of ratchet teeth being in an overrunning relationship with said second jaw member ratchet teeth when said pawl is moved in a second direction, and said first set of ratchet teeth being in an intermeshing relationship with said second jaw member ratchet teeth to directly drive said second jaw member when said pawl is moved in a first direction and when said second set of ratchet teeth are biased into engagement with said second jaw member ratchet teeth, said second set of ratchet teeth being in an overrunning relationship with said second jaw member ratchet teeth when said pawl is moved in said first direction and said second set of ratchet teeth being in an intermeshing relationship with said second jaw member ratchet teeth to directly drive said second jaw member when said pawl is moved in said second direction; and selective biasing means mounted on said linkage for selectively biasing either said first set of pawl ratchet teeth or said second set of pawl ratchet teeth into engagement with said ratchet teeth of said second jaw member, whereby said pawl is moved in said first direction upon pivoting said handle grips away from each other and said pawl is moved in said second direction upon pivoting said handle grips towards each other.

18. The hand-held ratchet tool as recited in claim 17 wherein said selective biasing means includes a thumb member pivotally mounted on said linkage for selectively engaging either said first set of ratchet teeth or said second set of ratchet teeth of said pawl into driving engagement with said second jaw member ratchet teeth, said thumb member having a first position such that said first set of ratchet teeth are biased into engagement with said second jaw member ratchet teeth and a second position such that said second set of ratchet teeth are biased into engagement with said second jaw member ratchet teeth.

19. The hand-held ratchet tool as recited in 18 wherein said selective biasing means further includes a leaf spring interconnected between said thumb member and said pawl.

* * * * *